July 12, 1932.    F. W. KELLS    1,866,935
GENERATOR
Filed Nov. 22, 1930    3 Sheets-Sheet 1

F. W. Kells  Inventor

By C. A. Snow & Co.
Attorneys.

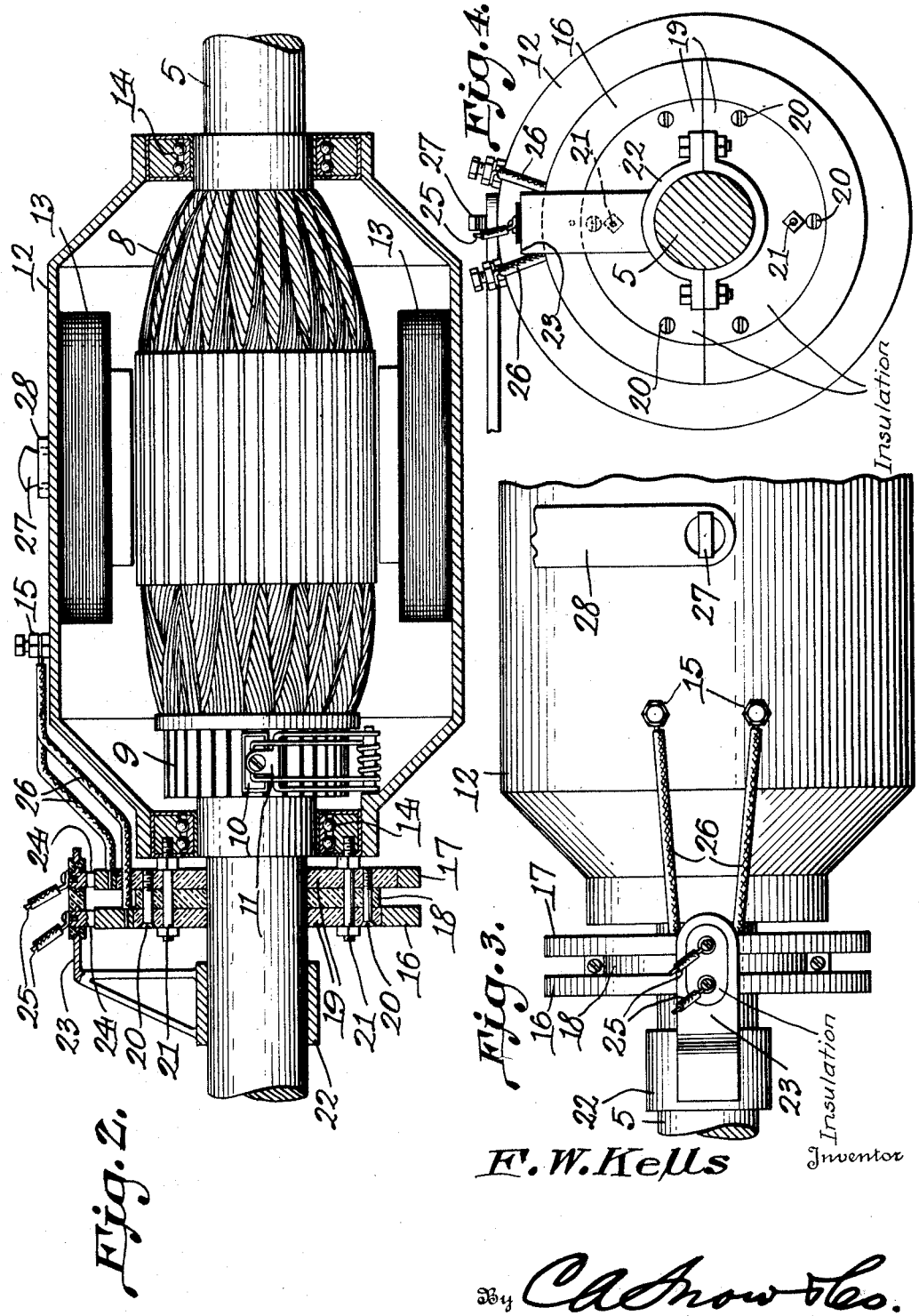

July 12, 1932.　　　　F. W. KELLS　　　　1,866,935
GENERATOR
Filed Nov. 22, 1930　　　3 Sheets-Sheet 3
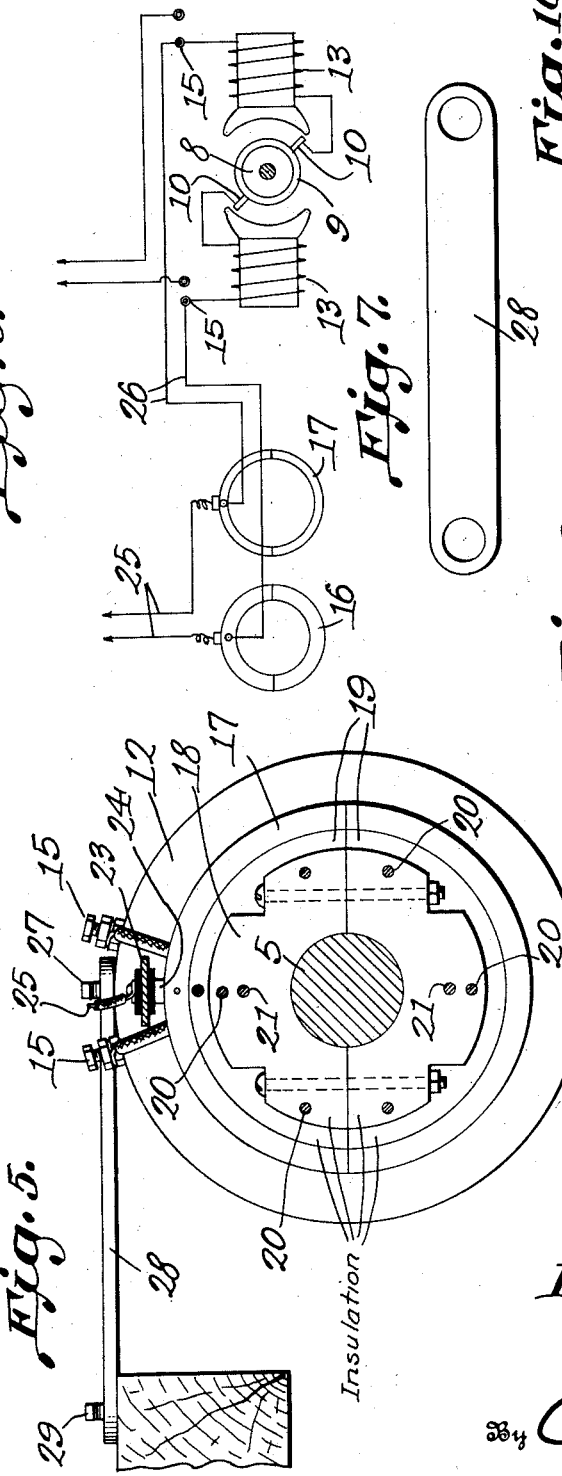
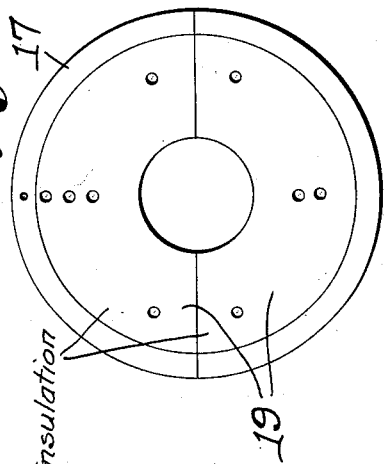
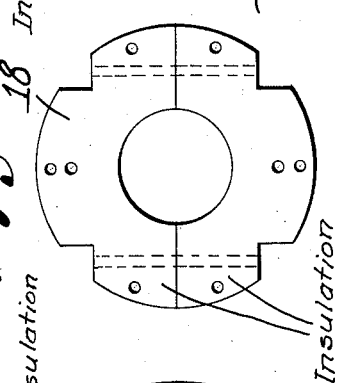
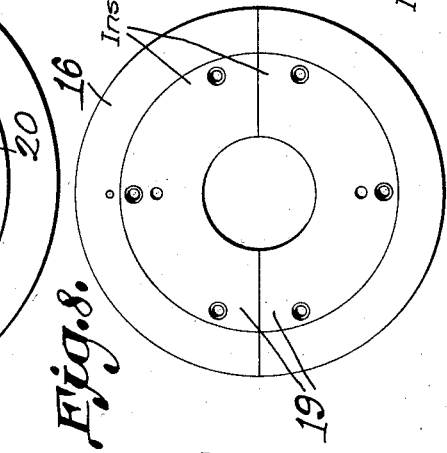
F. W. Kells Inventor
By C. A. Snow & Co.
Attorneys.

Patented July 12, 1932

1,866,935

UNITED STATES PATENT OFFICE

FRANK W. KELLS, OF LAKELAND, FLORIDA, ASSIGNOR TO KELLS GENERATOR & AUTOMATIC REFRIGERATOR, INC., A CORPORATION OF DELAWARE; R. A. KING AND J. M. HARMAN, RECEIVERS

GENERATOR

Application filed November 22, 1930. Serial No. 497,576.

This invention relates to generator construction, and more particularly to generators designed for use in connection with railway rolling stock, for supplying the railway rolling stock with electric energy, for lighting, heating, refrigerating, and other purposes.

The primary object of the invention is to provide a generator designed for mounting directly on an axle of a car, to generate electric energy as the axle rotates, thereby eliminating the usual belts, pulleys, and gearing used in transmitting movement to generators of this type, now in common use.

An important object of the invention is the provision of a generator of this character wherein the generator may be converted into a motor to facilitate the testing of the motor, novel means being provided for releasing the housing and field of the generator to permit the housing and field to rotate, when current is supplied thereto, thereby eliminating the necessity of jacking up the car wheels to test the generator.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 2 is a longitudinal sectional view through the generator.

Figure 3 is a fragmental plan view of the generator.

Figure 4 is an end elevational view of the generator.

Figure 5 is a sectional view through the axle.

Figure 6 is a diagram illustrating the circuits.

Figure 7 is a plan view of the anchor bar used in anchoring or securing the armature housing against rotary movement, under normal conditions.

Figure 8 is an end view of one of the collector rings.

Figure 9 is an elevational view of the spacer used between the rings.

Figure 10 is a view of the collector ring used at the other side of the spacer.

Figure 1:
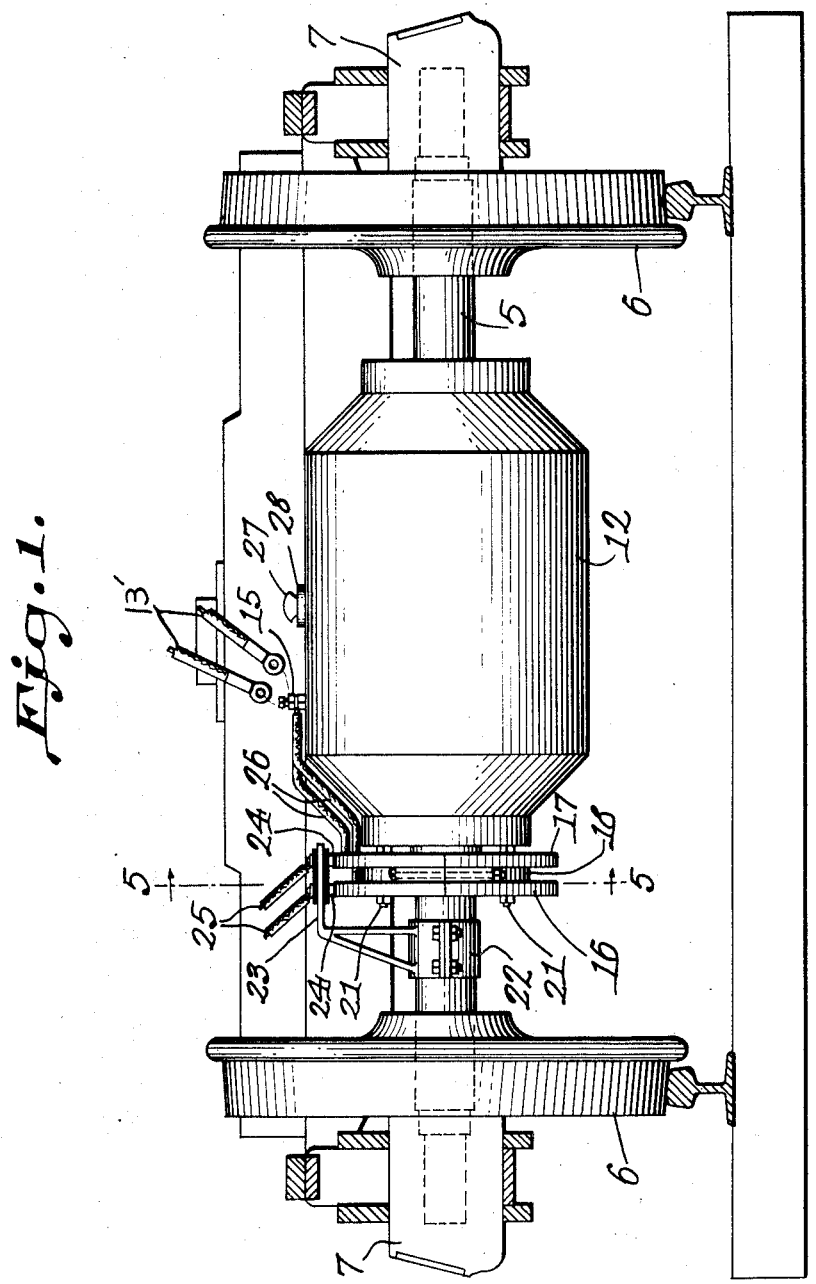
Figure 1 is an elevational view illustrating a generator constructed in accordance with the invention, as mounted on the axle of a car.

Referring to the drawings in detail, the reference character 5 designates a car axle on which the usual wheels 6 are mounted, the axle being mounted in the usual journal boxes 7.

The generator forming the essence of this invention, embodies an armature indicated generally by the reference character 8, and as shown the armature is mounted directly on the axle 5, the armature having been positioned prior to the positioning of the wheels 6. At one end of the armature 8, is the usual commutator 9, which is engaged by the brushes 10 mounted in the brush holders 11. The generator also includes the housing 12, which is of the desired construction to support the field windings 13, that cooperate with the armature, in generating electric energy, when the axle of the car rotates. Wires 13' as shown by Figure 1 of the drawings, are secured to the posts 15, so that electric energy may be fed to the field windings, in the usual and well known manner.

At the ends of the housing, are bearings 14 that support the housing and permit of free rotary movement of the axle and armature, with respect to the housing. Posts 15 are mounted on the housing, and provide means for connecting the wires providing the circuit from the generator, to the battery charged by the generator, and which has been omitted in the present showing.

The important feature of the invention, is the provision of means whereby the generator may be readily and easily converted into a motor, to test the motor, and with this end in view, I have provided a pair of collector rings 16 and 17 respectively, the collector rings being spaced apart by means of the sectional spacing member 18, which is of course constructed of insulating material. The collector rings also embody insulating members 19, to which the collector rings proper are secured, in any suitable and well known manner. Bolts 20 extend through the insulating members and spacing member of the collector rings, to secure the insulating members and spacing members together. The bearings at one end of the housing 12 are formed with threaded openings to receive the threaded ends of the bolts 21, which bolts also extend through the collector rings, to removably secure the collector rings in position on the housing, to rotate therewith.

It might be further stated that the collector rings are also of sectional construction, to permit them to be readily and easily positioned around the axle, in a manner as shown by Figure 2 of the drawings.

Forming a part of the testing mechanism, is a bracket 22 which is also sectional in formation, so that it may be clamped around the axle 5. Extending inwardly from the upper end of the bracket 22 is an arm 23 that carries brushes 24 which rest on the collector rings, to supply electric energy thereto.

Electric energy may be supplied to the brushes 24, through the wires 25 that lead from a suitable source of electric current. Wires 26 lead from the collector rings 16 and 17, and connect with the posts 15, so that electric current passing into the collector rings, may be directed to the generator, through the posts 15, converting the generator into a motor.

Extending upwardly from the housing 12 is a pin 27, the pin being designed to fit within an opening at one end of the anchor bar 28, the pin being provided with a head, to prevent the bar from becoming displaced. A pin 29 extends upwardly from the bolster of the truck carrying the generator, the pin being designed to fit within the opening at the opposite end of the anchor bar. Thus it will be obvious that due to this construction, the anchor bar will hold the housing against rotary movement, under normal conditions, or when the device is operating as a generator. Should it be desired to test the generator, the anchor bar 28 is removed from its position as shown by Figure 5 of the drawings. The tester is now supplied to one end of the housing, as previously described, and the wires 13' are disconnected from the posts 15. Electric current is fed to the generator through wire 25 causing the generator to act as a motor. It will of course be obvious that since the axle 5 remains stationary, the housing 12 will rotate, indicating the operativeness of the generator, eliminating the necessity of jacking up the wheels of the truck, to make the test.

I claim:

1. A generator comprising an armature mounted on a car axle to rotate therewith, a housing surrounding the armature, field coils supported within the housing and cooperating with the armature to generate electricity, outlet wires for carrying off electric energy from the generator, removable means for normally securing the housing against rotary movement, and said housing adapted to rotate around the armature when the housing securing means is removed and when current is supplied through the outlet wires to convert the generator into a motor for testing the generator.

2. A generator comprising an armature mounted on a car axle to rotate with the axle, a housing surrounding the armature, field coils supported within the housing and cooperating with the armature to generate electricity, outlet wires for carrying off electric energy, a removable anchor bar connected with the housing for normally holding the housing against rotary movement, and said housing adapted to rotate around the armature when the anchor bar is removed and electric energy is supplied through the outlet wires.

3. A generator comprising an armature mounted on a car axle of a car truck, said armature adapted to rotate with the axle, a housing surrounding the armature, a pin extending upwardly from the housing, a pin extending upwardly from the car truck, an anchor bar having openings to receive the pins, said anchor bar adapted to hold the housing against rotary movement under normal conditions, and said housing adapted to rotate around the armature when the anchor bar is removed and electric energy is supplied to the generator.

4. A generator comprising an armature mounted on a car axle to rotate therewith, a housing surrounding the armature and carrying field coils cooperating with the armature to generate electricity, means for normally securing the housing against rotary movement, outlet wires for carrying electricity from the housing, removable collector rings mounted at one end of the housing, wires providing a circuit between the collector rings and outlet wires, and brushes operating over the collector rings for supplying electric energy to the field coils of the armature, through the collector rings, and wires leading from the collector rings to the outlet wires.

5. A generator comprising an armature mounted on a car axle to rotate therewith, a housing surrounding the armature, field coils supported within the housing and cooperating with the housing to generate electricity, collector rings, means for removably mounting the collector rings at one end of the housing, wires providing a circuit between the collector rings and generator to convert the generator into a motor, a bracket removably secured to the axle, an arm extending from the bracket, brushes on the arm, said brushes contacting with the collector rings to supply the rings with electric energy, and wires leading from a source of electricity supply connected with the brushes.

6. A generator comprising an armature mounted on a car axle, a housing surrounding the armature and carrying field coils cooperating with the armature to generate electricity when the axle rotates, a removable member for normally anchoring the housing against rotary movement, and means for supplying electric energy to the field coils of the housing to rotate the housing when the anchoring member is removed and electric energy is supplied to the generator.

7. In a generator, a normally movable member and a normally stationary member cooperating with the movable member to generate electricity, removable means for anchoring the normally stationary member against movement, and said normally stationary member adapted to rotate around the normally movable member when the removable anchoring means is removed and electric energy is directed to the generator to convert the generator into a motor.

8. In a generator, a normally movable member, and a normally stationary member cooperating with the movable member to generate electricity, a removable member for anchoring the normally stationary member against rotary movement, and said normally stationary member adapted to rotate around the first mentioned member when the anchoring member is removed.

9. In a generator, a normally movable member, and a normally stationary member cooperating with the movable member to generate electricity, an anchoring bar, means for connecting one end of the anchoring bar with respect to the car truck, means for connecting the opposite end of the bar to the normally stationary member to permit of movement of the bar with respect to the normally stationary member, and said normally stationary member adapted to rotate around the first mentioned member when the removable anchoring member is removed.

In testimony that I claim the foregoing as my own, I have hereto affixed my signature.

FRANK W. KELLS.